Feb. 28, 1956  H. L. KEELER, JR  2,736,395
AUTOMATICALLY CONTROLLED BRAKING APPARATUS
Filed June 27, 1951  2 Sheets-Sheet 1

INVENTOR.
Harry L. Keeler Jr.
BY
Barnes, Kisselle, Laughlin & Raisch
ATTORNEYS.

Feb. 28, 1956     H. L. KEELER, JR     2,736,395
AUTOMATICALLY CONTROLLED BRAKING APPARATUS
Filed June 27, 1951     2 Sheets-Sheet 2

INVENTOR.
Harry L. Keeler Jr.
BY
Barnes, Kisselle, Laughlin & Raisch
ATTORNEYS.

united States Patent Office 2,736,395
Patented Feb. 28, 1956

2,736,395
AUTOMATICALLY CONTROLLED BRAKING APPARATUS

Harry L. Keeler, Jr., Detroit, Mich.

Application June 27, 1951, Serial No. 233,883

6 Claims. (Cl. 188—181)

This invention relates to braking apparatus which automatically controls the brake application so that the brake application is proportional to the load carried by the wheel and the friction between the wheel and the surface with which the tire is in contact. It is also applicable to other vehicles and other machines where brakes are used.

It is well understood that when one reaches a surface which is slippery by reason of ice, snow, or wetness, the application of the brakes must be eased or the vehicle is liable to skid. It is customary for a skilled driver, when he has cause to stop or slow a car on a slippery surface to apply the brakes just momentarily and repeatedly, rather than to jam the brakes on full.

It is the object of the present invention to so apply the brakes repeatedly and momentarily automatically when the driver presses down full strength on the brake pedal.

A further object of this invention, as it pertains to pneumatic-tired vehicular braking, is to provide a system which will afford the maximum retarding force, at each wheel provided with a brake, consistent with the frictional characteristics of the area of road surface with which that particular wheel makes contact, independent of the skill or manipulation of the operator.

An additional object of this invention is to provide, in the case of vehicular applications, a means of stopping a vehicle in the shortest possible distance as inexorably determined by basic physical phenomena without regard to the skill and experience of the operator.

Another object of this invention is to extend the service life of vehicular pneumatic tires by preventing locking of the brakes which causes the tire to slide instead of rolling to a stop. The invention will also have the same effect upon steel wheels on a track.

A further object of this invention, again as applied to vehicular braking, is to obviate a well known and dangerous phenomenon which comes about when the rear wheels of a vehicle lock and slide while the front wheels continue to rotate. Under this very common condition the vehicle is subject to lateral deviation from its initial path, resulting in a tendency to "jack-knife" in the case of trailed vehicles.

Another object of this invention is to eliminate the necessity for proportioning the available braking force between front and rear wheels of a vehicle as is presently done in order to compensate for the transfer of wheel loads from rear to front as a result of deceleration. Since with my invention the braking force is at all times proportional to the load carried by a particular wheel, fixed mechanical proportioning, which can be no more than a compromise, is unnecessary.

A further object of this invention is to promote greater safety on the roads and highways by providing a braking system which is free of the human element to a greater extent than heretofore obtainable.

A further object of this invention is to promote safety on the roads and highways by preventing locking of the front or steering wheels of a vehicle which results in a complete loss of steering control, since, under these conditions, the vehicle will continue in an approximately straight path regardless of the angles through which these wheels may be turned in an effort to guide the vehicle around curves, obstructions, and so forth.

Another object of this invention is to provide certain mechanisms which guarantee that no loss of ultimate braking force will be suffered in the event that the proportional control mechanism should fail to function. Since any mechanism is subject to failure, this provision is of great importance.

Referring to the drawings.

Figures 1, 2:
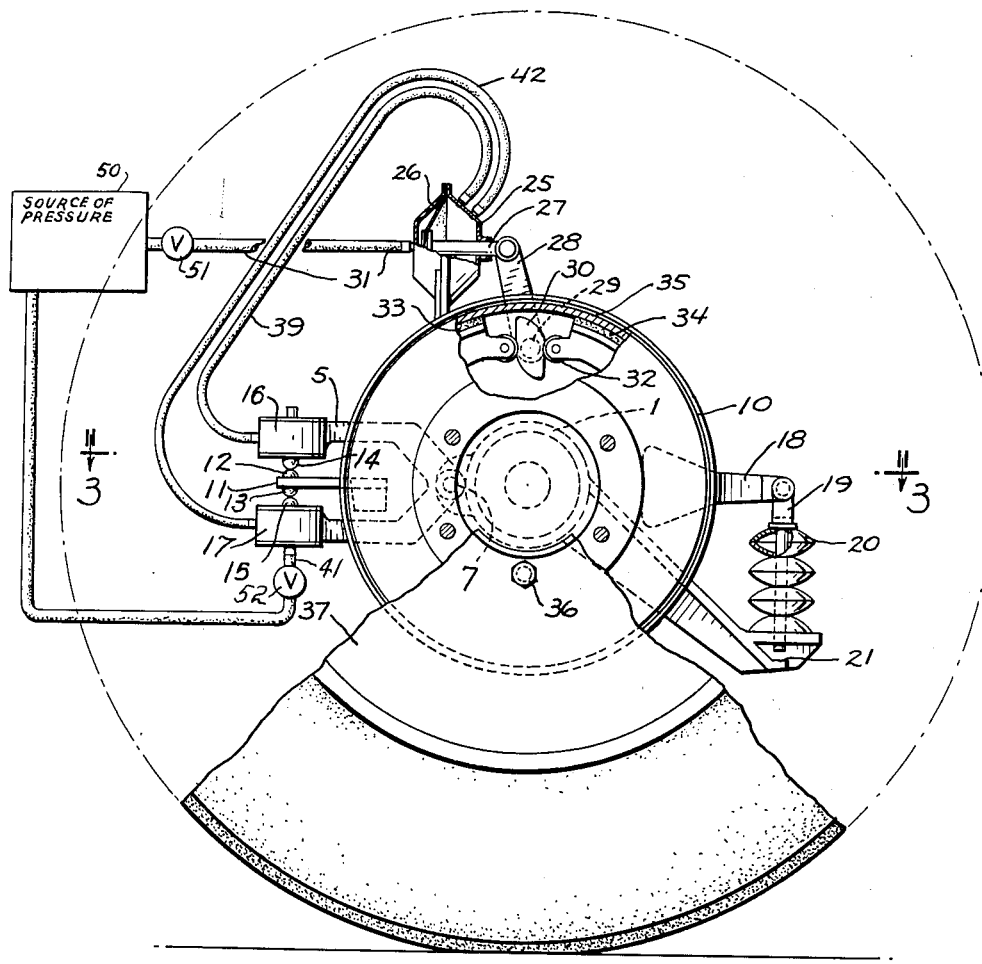
Fig. 1 is an elevation of the braking apparatus with parts broken away and in section.
Fig. 2 is a fragmentary view of the lower part of the braking apparatus.
Figure 3:
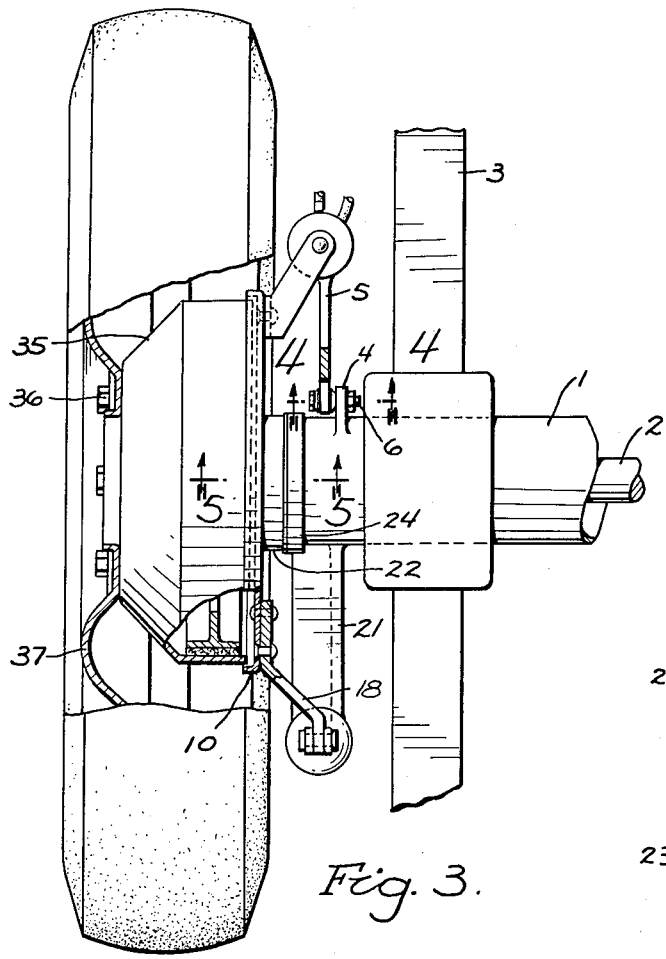
Fig. 3 is a top plan view of a wheel and tire with parts broken away to show the braking apparatus. The sectional part of the view is taken on the line 3—3 of Fig. 1.
Figure 4:
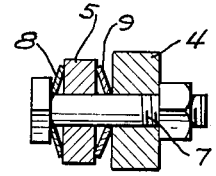
Fig. 4 is a fragmentary enlarged section showing the frictional pivoting of the compensating valve unit.

1 designates the axle housing, 2 the live axle. 3 is the suspension spring for the frame and body. 4 is an axle flange to which the compensating valve unit or yoke 5 is pivoted at 6 by means of a bolt 7 and the cupped spring washers 8 and 9. This affords a resistance to the movement of the compensating valve unit so that the unit will only move when it is positively controlled by means of the movement of the brake backing plate 10. It also allows some lost movement of the yoke after a valve has been moved to fully open position. It requires only a minimal movement to open a valve. To the brake backing plate is rigidly fixed an operating lever 11 which has contacts 12 and 13 which contact the valves 14 and 15 respectively, see Fig. 6. The valve 14 is contained in a vent valve housing 16 and the valve 15 in a pressure valve housing 17.

The backing plate has fixed thereto, shown at the opposite side for convenience, but of equal efficiency at any point on the plate, a lever 18 which connects with a rod 19. When the backing plate 10 starts to move, this movement is resisted by the spring cups 20 bearing against the arm 21 which is fastened to the axle housing 1. Other forms of yieldable resistance may be used.

Figure 5:
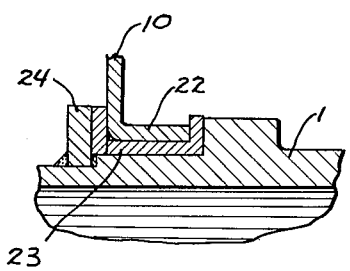
Fig. 5 is a section on the line 5—5 of Fig. 3.

The backing plate 10 has a turned in flange 22 which fits on the bearing ring 23 of the axle housing 1 (see Fig. 5). The backing plate is held on this bearing by means of the washers 24. It may be desirable to have a ball or roller bearing here in place of a plain bearing, but it was thought only necessary to show a plain bearing.

I have shown in the apparatus of the drawings an air brake, but obviously the fluid might be liquid and a hydraulic braking system or conceivably the motor might be an electric motor. Here the motor comprises an air motor 25 with a diaphragm 26 and a push rod 27 connected with the crank 28 that is fastened to the cam shaft 29 which in turn is provided with the brake operating cam 30.

This motor is ordinarily operated by allowing compressed air to come through the tube 31 from an air supply 50 controlled by a brake pedal actuated valve 51 to the left side of the motor. The air supply is conventional and maintains a reserve of air pressure greater than is necessary for normal application of the brakes. The amount and force of this compressed air is controlled by the valve which is ordinarily controlled by the foot of the driver. When air under pressure comes in through the tube 31, the diaphragm 26 moves to the right turning the crank 28, the cam shaft 29, and the cam 30. This cam, through the rollers 32, spreads the brake shoes 33 and 34 and expands them into contact with the rotating brake drum designated 35. The brake shoes are pivoted at 38 to the backing plate 10 and a spring (that isn't here shown) normally tends to keep the shoes released from the brake drum 35.

Figure 6:
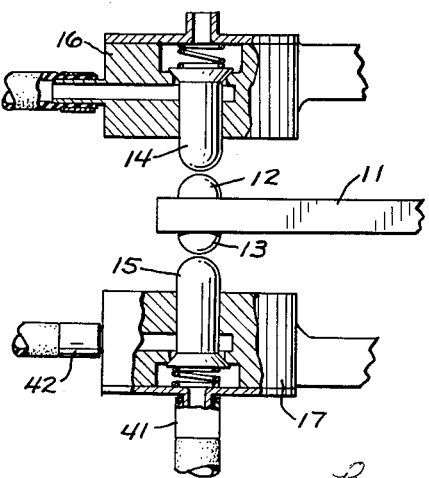
Fig. 6 is an enlarged sectional detail of the compensating valve unit, the operating lever, and the valves.

When the brake shoes are in released position the compensating valves 14 and 15 are as shown in Fig. 6. These valves are of the balanced type wherein the pressure required to operate them is virtually constant and independent of the line pressure to them. When the brakes take effect by reason of the operator turning pressure into the left hand side of the motor housing, the brake shoe carrying plate tends to rotate in the same direction that the brake drum is rotating, but only a limited extent. A stop 21 is provided to prevent more than a very limited angle of rotation by engagement with stop rod 19. The stop allows limited motion sufficient to give maximum braking effort for a given design application. Furthermore, the spring cups 20 also oppose rotation of the brake carrying plate. This limited rotation causes the control arm 11 to rotate upwardly from the position shown in Fig. 6. Valve 14 opens and vents the air on the right hand side of the motor to the atmosphere through the tube 39. If a full quota of air comes into the motor through tube 31, then the brakes are applied to substantially the locking position. But if a graduated amount of air comes into the left hand side of the motor, then the degree of application of the brakes is proportional to the pressure. Now, if when the brakes are applied, the coefficient of friction between the tire and the road surface is not the usual coefficient of friction when one has a dry surface and tires, then the strong spring resistance members take effect proportionately to the decrease of the coefficient of friction from what is the maximum coefficient of friction. This tends to rotate the brake shoe carrying plate in the opposite direction from the rotation of the brake drum, that is, in this case, counterclockwise. This will carry along the control lever 11 and rotate this lever counterclockwise, or downward from the position shown in Figs. 1 and 6. This causes the valve 15 to open and valve 14 will be closed by the spring pressure. This will close the vent to the atmosphere on the right side of the motor and will open the air line 41 which leads to the source of air pressure 50 through a suitable reduction valve 52 and air will pass through the valve housing, thence through tubing 42 to the right side of the motor, and this will tend to neutralize the pressure on the other side of the diaphragm and proportionately release the brakes depending on just how much of a movement of the valve compensating unit takes place by the alteration of the friction. If the tire meets ice or something that causes it to lose substantially all the friction, and to skid, then there is a maximum turn of the brake shoe carrying plate caused by the spring cups. This will apply full pressure on the right side of the motor and completely neutralize the pressure on the left side of the diaphragm and thereby release the brakes. Just as soon as the tire meets with some friction on the road surface, there is a tendency for the brake carrying plate to again revolve with the drum and a proportional application of the brake is had by movement to close the air supplying valve for the right hand side of the motor and the opening of the vent for this side of the motor. This operation of applying and releasing the brakes goes on as long as the operator applies the air pressure to the motor and the tire keeps slipping and cannot take hold on the slippery road surface. This action takes place on each wheel entirely independent of the other wheels and provides the best braking effort to deal with the tendency of the wheels to skid on a slippery road.

What I claim is:

1. Braking apparatus for controlling the application of the brakes to a revolving brake drum on a vehicle having an axle housing, having in combination a brake operating member, a motor with a movable element having a connection with a source of energy and a control for the energy said movable element being actuated in one direction under control of the driver, and activated in the other direction under automatic control as hereinafter stated, connections between said movable element and the brake operating member to move the brakes with respect to the brake-drum, brake shoes, a brake-carrying plate movably supporting the shoes and supported by the wheel axle housing for limited rotation about said housing, yielding resistance means for opposing the limited turning movement of the brake-carrying plate in one direction, a control arm fastened to the brake-carrying plate, and a brake compensating unit movably supported upon the axle housing and having control members one on each side of the end of the control arm to control the effectiveness of the movable element of the motor, one of said control members having means, upon application of the brakes, for decreasing resistance in the motor to the movement of the motor element to make fully effective the brake operating motor to apply the brakes when the coefficient of friction between the outer wheel surface on which it rolls is substantial, the other of said control members having means, upon decrease of said coefficient of friction, to apply counter energy to reverse the movement of said motor element thereby partially or completely releasing the brakes.

2. The combination claimed in claim 1 in which the motor is a fluid pressure operated motor and the control members each include a valve housing and valve, one serving to release the pressure on one side of the motor when the brakes are taking effect normally, and the other housing and valve being opened while the first mentioned valve is closed when the friction between the tire and the road surface is subnormal to build up a pressure resistance on one side of the motor to tend to neutralize the movable motor element.

3. The combination claimed in claim 1 in which said compensating unit includes a yoke with one arm bearing a valve housing and valve above the control lever, and the other arm bears a valve housing and valve below the control lever, the one housing and valve serving to release the pressure on the outlet side of the motor and also close the outlet from the motor when the valve is in closed position, and the other housing and valve serving to turn positive fluid pressure in the outlet side of the motor when the outlet valve is closed and the friction between the tire and the road surface is insufficient to turn the brake members against the resistance of the yielding member.

4. The combination claimed in claim 1 in which the brake compensating unit includes a member with arms pivotally mounted on the axle housing by means of a friction pivot that assures against accidental actuating of the brake compensating unit.

5. The combination claimed in claim 1 in which the yielding resistance element is a lever arm attached to the brake-carrying plate and a rod pivoted at one end to the lever and a plurality of spring cups mounted between said lever arm and said axle housing to resist movement of said lever arm.

6. The combination claim in claim 1 in which the movable element of said motor has a diaphragm to which is attached a rod, said brake operating member comprising a cam, a cam shaft supporting said cam, and a crank connecting said cam shaft to said rod for rotation of said cam to spread the brake shoes.

References Cited in the file of this patent

UNITED STATES PATENTS

| 808,716 | Barry | Jan. 2, 1906 |
| 902,643 | Pfander | May 4, 1909 |
| 1,842,608 | Hiatt | Jan. 26, 1932 |
| 1,961,831 | Sanford | June 5, 1934 |
| 2,279,433 | Logan, Jr. | Apr. 14, 1942 |
| 2,279,732 | Brewer | Apr. 14, 1942 |